(12) United States Patent
Cheung et al.

(10) Patent No.: US 8,246,098 B2
(45) Date of Patent: Aug. 21, 2012

(54) TAILGATE FOR A PICKUP TRUCK

(75) Inventors: Danny C. Cheung, Dublin, OH (US);
Kenneth M. Hartlaub, Powell, OH (US)

(73) Assignee: Honda Motor Co., Ltd, Tokyo (JP)

( * ) Notice: Subject to any disclaimer, the term of this patent is extended or adjusted under 35 U.S.C. 154(b) by 1095 days.

(21) Appl. No.: 12/018,478

(22) Filed: Jan. 23, 2008

(65) Prior Publication Data

US 2009/0183433 A1 Jul. 23, 2009

(51) Int. Cl.
*B62D 33/027* (2006.01)
*B62D 33/023* (2006.01)
*B62D 33/03* (2006.01)
*B62D 33/033* (2006.01)
*B62D 33/037* (2006.01)

(52) U.S. Cl. ............... 296/51; 16/366; 49/192; 49/246; 296/57.1; 296/146.12; 296/149

(58) Field of Classification Search ............ 16/366; 49/149, 208, 246, 400, 192; 296/50, 51, 296/57.1, 61, 146.8, 146.11, 146.12, 149; 414/537
See application file for complete search history.

(56) References Cited

U.S. PATENT DOCUMENTS

| | | | | |
|---|---|---|---|---|
| 382,707 A | * | 5/1888 | Keating | 49/192 |
| 674,320 A | * | 5/1901 | Sebring | 296/51 |
| 872,694 A | * | 12/1907 | Thiem | 126/194 |
| 1,104,434 A | * | 7/1914 | McColly | 292/7 |
| 1,207,266 A | * | 12/1916 | Bartholomew | 296/51 |
| 1,317,905 A | * | 10/1919 | Baughman | 296/51 |
| 1,320,146 A | * | 10/1919 | James | 296/51 |
| 2,374,697 A | * | 5/1945 | Palisano et al. | 296/50 |
| 3,155,203 A | * | 11/1964 | Kappen et al. | 49/37 |
| 3,434,754 A | * | 3/1969 | Scaglione | 296/76 |
| 3,456,977 A | | 7/1969 | Dugan | |
| 3,592,504 A | | 7/1971 | Sandor | |
| 4,033,619 A | * | 7/1977 | Cox | 296/21 |
| 4,076,301 A | | 2/1978 | Gergoe | |
| 4,136,905 A | | 1/1979 | Morgan | |
| 4,372,601 A | * | 2/1983 | Smith | 296/50 |
| 4,750,777 A | * | 6/1988 | Brammer | 296/50 |
| 4,763,944 A | * | 8/1988 | Fry et al. | 296/50 |
| 4,968,084 A | | 11/1990 | Asher et al. | |
| 5,083,833 A | | 1/1992 | Herrmeyer | |
| 5,303,947 A | * | 4/1994 | Gerber | 280/423.1 |
| 5,516,178 A | | 5/1996 | Grant | |
| 5,685,594 A | * | 11/1997 | Harper | 296/51 |
| 5,711,569 A | * | 1/1998 | Sovoda | 296/57.1 |
| 5,865,495 A | * | 2/1999 | Nguyen | 296/50 |
| 5,931,519 A | * | 8/1999 | Jeffers et al. | 296/57.1 |
| 6,231,100 B1 | | 5/2001 | Fournier | |
| 6,685,204 B1 | | 2/2004 | Hehr | |

(Continued)

*Primary Examiner* — Glenn Dayoan
*Assistant Examiner* — Paul Chenevert
(74) *Attorney, Agent, or Firm* — Mark E. Duell; Michael A. Forhan; Eley Law Firm Co. LPA

(57) ABSTRACT

A tailgate for the bed of a pickup truck has a generally U-shaped tailgate frame that is adapted to be coupled to the bed of the pickup truck and is pivotable about a first axis between a generally vertical closed position and a generally horizontal open position. A door assembly is coupled to the tailgate frame and is pivotable about a second axis generally normal relative to the first axis for movement between a closed position proximate the tailgate frame and an open position away from the tailgate frame.

17 Claims, 5 Drawing Sheets

U.S. PATENT DOCUMENTS

| | | | |
|---|---|---|---|
| 6,742,826 B2 * | 6/2004 | Humphrey et al. | 296/51 |
| 6,764,130 B1 * | 7/2004 | Hull | 296/186.4 |
| 6,779,825 B1 * | 8/2004 | Greenert et al. | 296/51 |
| 6,913,305 B1 * | 7/2005 | Kern et al. | 296/51 |
| 7,080,713 B1 | 7/2006 | Riggs | |
| 7,168,721 B2 | 1/2007 | Mulder | |
| 7,380,873 B2 * | 6/2008 | Shoemaker | 296/182.1 |
| 2002/0105202 A1 * | 8/2002 | Ziv-Av | 296/56 |
| 2003/0015885 A1 * | 1/2003 | Landwehr | 296/61 |
| 2005/0116492 A1 * | 6/2005 | Wiley | 296/57.1 |
| 2010/0001544 A1 * | 1/2010 | Paley | 296/57.1 |
| 2012/0061987 A1 * | 3/2012 | Fraley et al. | 296/51 |

* cited by examiner

TAILGATE FOR A PICKUP TRUCK

FIELD

The present invention relates generally to a tailgate assembly for a pickup truck, in particular to a fold-down tailgate having a swing-open door assembly.

BACKGROUND

Pickup trucks typically have a truck bed defined by a floor, a front wall and two side walls, leaving a rectangular opening at the rear. The rear of the truck bed is normally closed off by a tailgate. Most tailgates are positionable between a generally vertical closed position and a generally horizontal open position that is substantially level with the bed. The bed has significant utility, providing a convenient space to haul cargo. In addition, many pickup trucks now include storage containers built into the floor of the bed for storing objects such as tools and cargo.

Many people experience trouble accessing the bed of a pickup because they are not tall enough to reach over the side walls of the bed or a closed tailgate. Similarly it can be difficult to reach across an open tailgate to access the bed. Such difficulties are especially prevalent with larger pickups, as the height of the bed can be considerable.

Others have attempted to overcome these drawbacks by mounting steps or ladders to the pickup, such as U.S. Pat. Nos. 7,168,721 to Mulder, 7,080,713 to Riggs and 6,685,204 to Hehr. However, these devices often consume cargo space, add weight to the vehicle and/or detract from the vehicle's appearance. Furthermore, there is a risk of injury from falling off the step or ladder. Accordingly, there is a need for a means by which one can access the bed of a pick-up truck easily with a minimal amount of stress or effort.

SUMMARY

A tailgate for a pickup truck is disclosed according to an embodiment of the present invention. The tailgate comprises a generally U-shaped tailgate frame that is adapted to be coupled to a bed of the pickup truck and is pivotable about a first axis between a generally vertical closed position and a generally horizontal open position, the tailgate frame being releasably latched to side walls of the pickup truck. A door assembly is coupled to the tailgate frame and is pivotable about a second axis generally normal relative to the first axis for movement between a closed position proximate the tailgate frame and an open position away from the tailgate frame. The door assembly may be releasably latched to the tailgate frame. In one embodiment an opening is formed in the door assembly, the opening being covered with a covering material comprising at least one of a metal panel, a plastic panel, a glass panel and a mesh material. The tailgate may further include a pair of tethers, each tether extending between a side wall of the pickup truck and a nearby arm of the tailgate frame and having a predetermined length to limit downward travel of the tailgate in the open position. A travel limiter may also be interposed between the tailgate frame and the door assembly to limit the travel of the door assembly to a predetermined maximum open position with respect to the tailgate frame.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
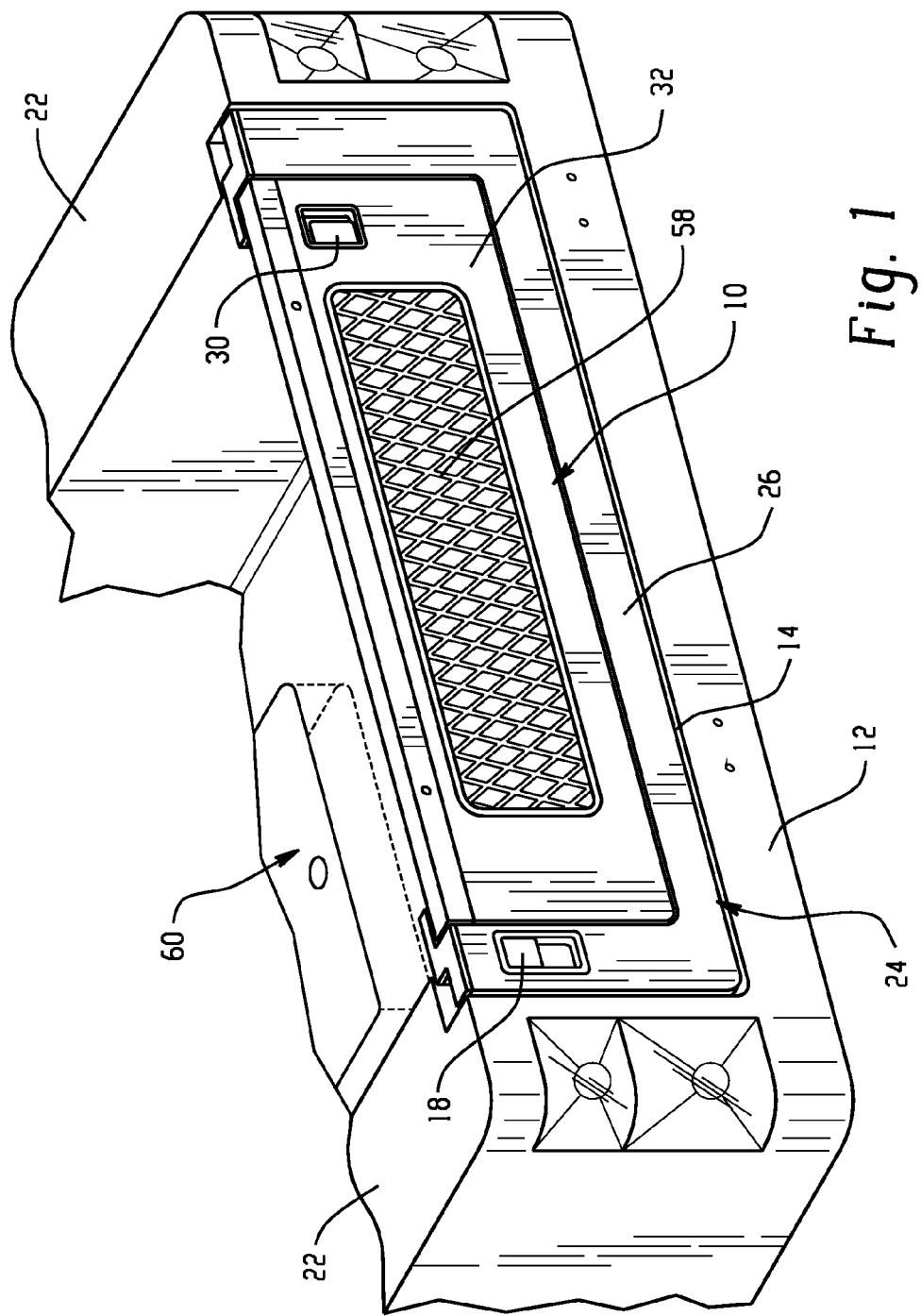
FIG. 1 is a perspective view of a tailgate for a pickup truck according to an embodiment of the present invention.
Figure 2:
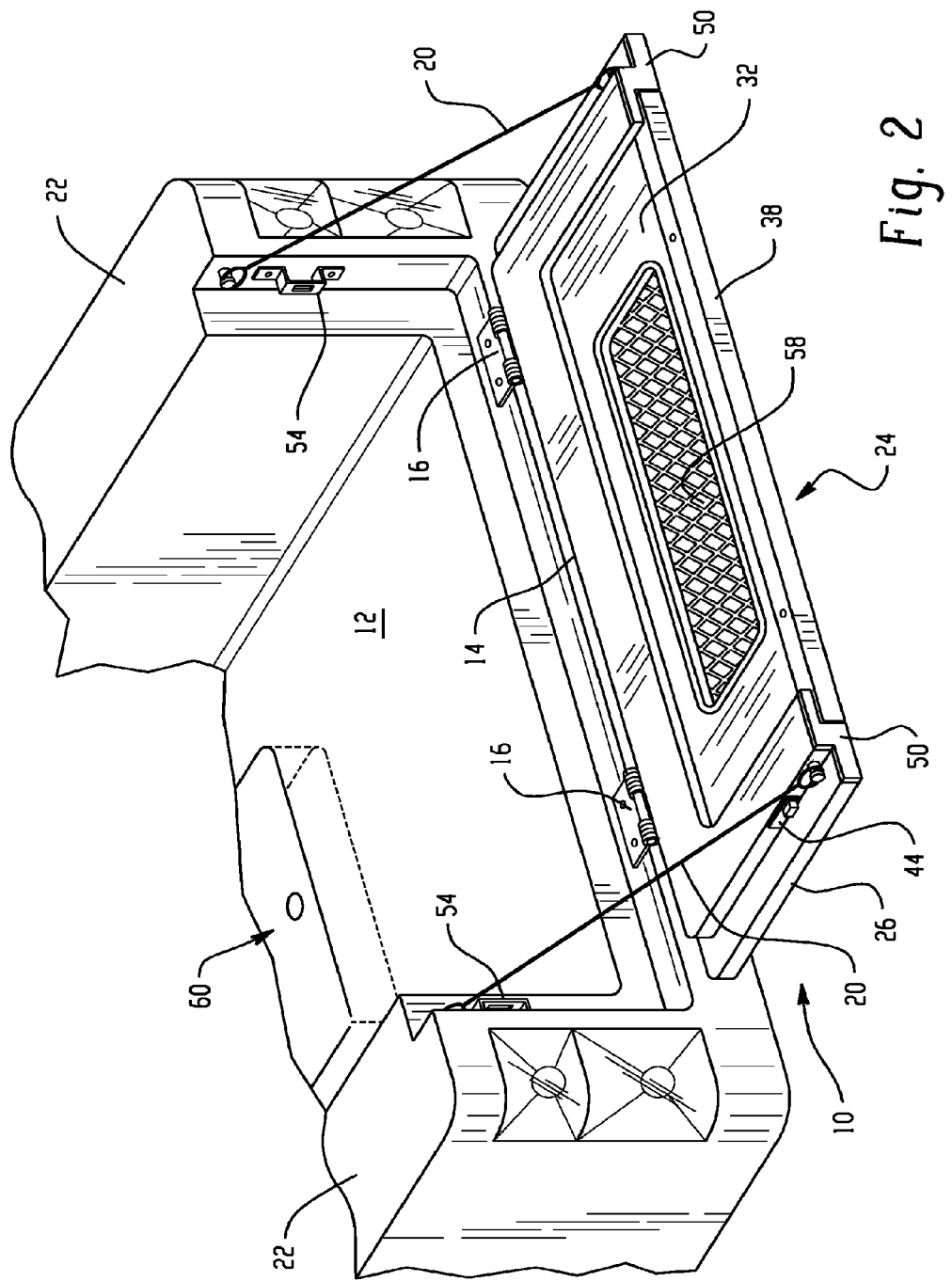
FIG. 2 is a perspective view showing the tailgate of FIG. 1 in a open position.

The general arrangement of a tailgate 10 for a pickup truck is shown in FIGS. 1 and 2 according to an embodiment of the present invention. Tailgate 10 is coupled to a bed 12 of the pickup truck along a lower edge 14 of the tailgate with a first set of hinges 16 and is pivotable about a first axis between a generally vertical closed position (FIG. 1) and a generally horizontal open position (FIG. 2) that is substantially level with the bed. The tailgate 10 is releasably held in the closed position by a tailgate latch, discussed in greater detail below. A tailgate release handle 18 is actuable to release the tailgate latch, allowing tailgate 10 to pivot downwardly from the closed position to the open position. A tether 20 is connected between each of a pair of side walls 22 of the pickup and nearby opposing edges of tailgate 10 for limiting downward travel of the tailgate and supporting the tailgate in the open position.

Figure 3:
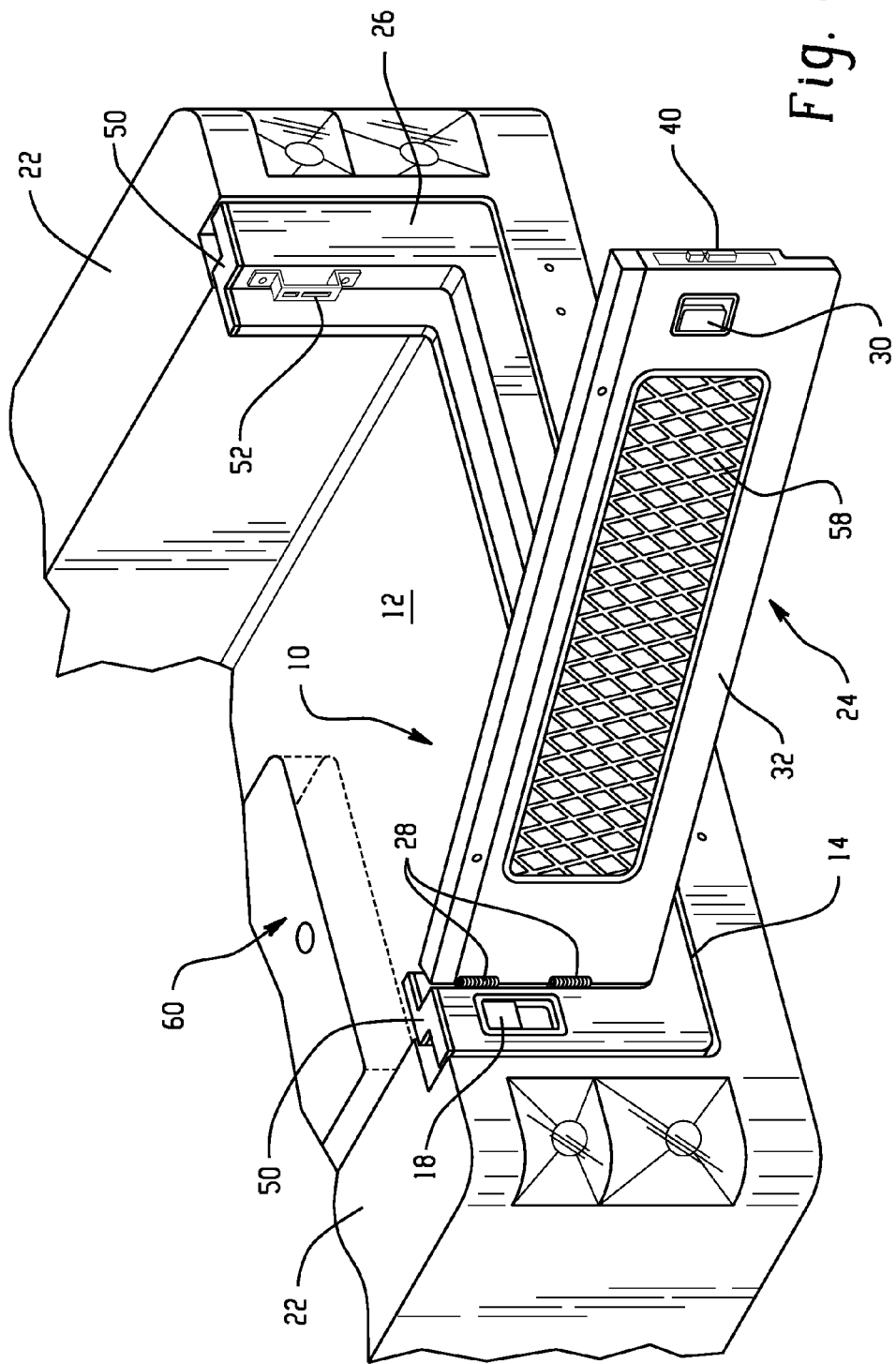
FIG. 3 is a perspective view showing the tailgate of FIG. 1 in a closed position and a door assembly of the tailgate in an open position.

With reference now to FIGS. 1 through 3 in combination, a door assembly 24 is hingedly coupled to a generally U-shaped tailgate frame 26 of tailgate 10 and is pivotable upon a second set of hinges 28 about a second axis, generally normal relative to the first axis, for movement between a closed position and a swing-open position. The door 24 is releasably held in the closed position (FIG. 1) by a door latch, discussed in greater detail below. A door release handle 30 is actuable to release the door latch, allowing door 24 to pivot away from tailgate frame 26 (FIG. 3).

Figure 4:
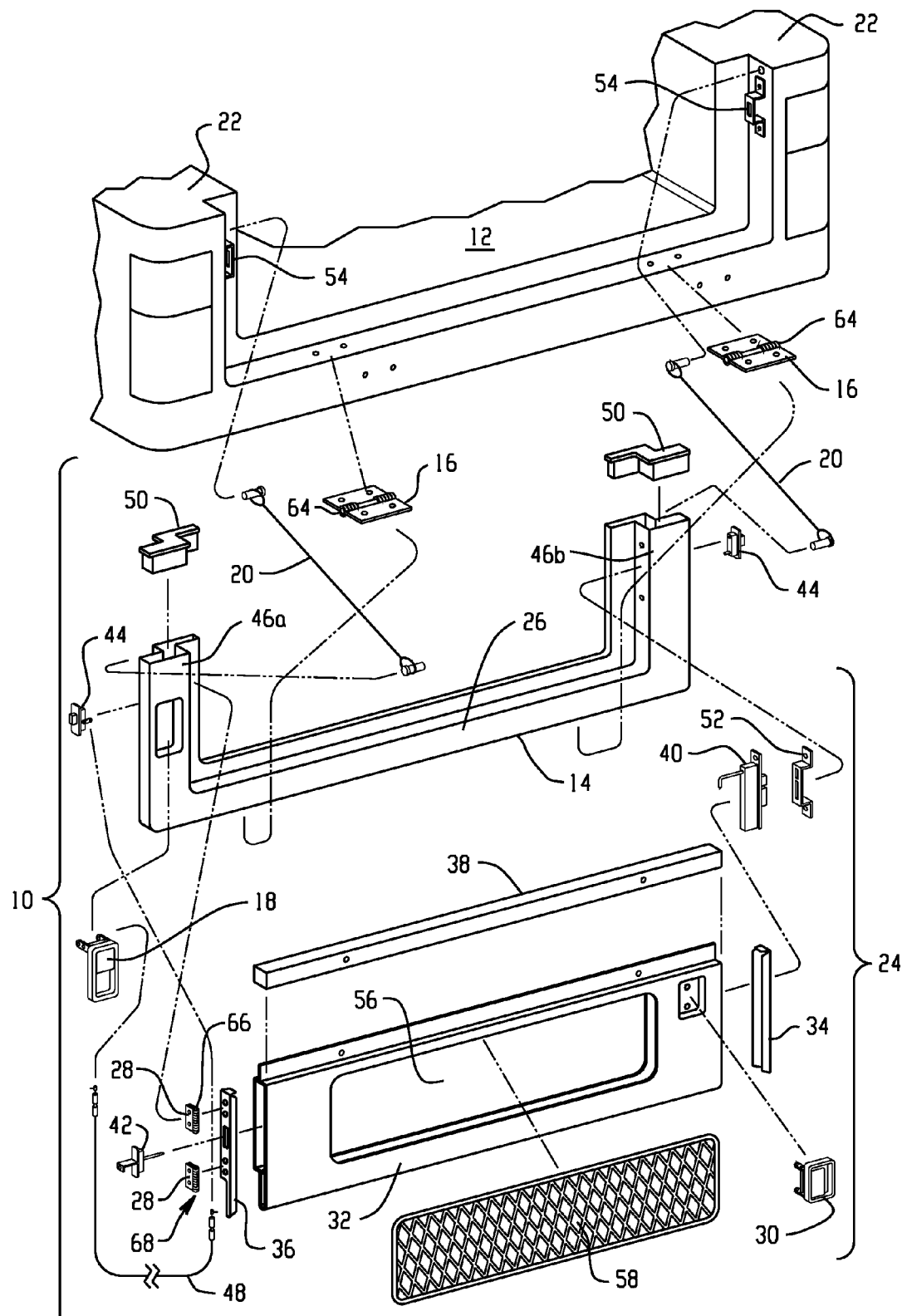
FIG. 4 is an exploded view showing the assembly of a tailgate for a pickup truck according to an embodiment of the present invention.

An exploded view showing the assembly of tailgate 10 is shown in FIG. 4 according to an embodiment of the present invention. Door 24 is formed by assembling together a door frame 32, right and left door pillars 34 and 36, respectively, and a cover 38. A door latch 40 is coupled to right pillar 34, while a travel limiter 42 is coupled to left pillar 36. Door release handle 30 is secured to door frame 32 and is operatively coupled to door latch 40 such that the door latch is released when the door release handle is actuated.

Tailgate 10 is assembled by coupling tailgate release handle 18 to tailgate frame 26. A pair of tailgate latches 44 are likewise coupled to opposing left and right arms 46a, 46b respectively of tailgate frame 26. One or more actuating cables 48, such as a Bowden cable, are operatively coupled between tailgate release handle 18 and tailgate latches 44 such that the tailgate latches are released when the tailgate release handle is actuated. A pair of caps 50 are joined to arms 46a, 46b to close off the arms. A door striker 52 is also attached to tailgate frame 26 to engage door latch 40.

Door 24 is coupled to tailgate frame 26 by one or more door hinges 28, and is releasably secured to the tailgate frame by door latch 40 in cooperation with door striker 52. Tailgate 10 is in turn coupled to bed 12 by one or more hinges 16 extending between lower edge 14 of the tailgate and the bed, and is releasably secured to side walls 22 by tailgate latches 44 in cooperation with corresponding tailgate strikers 54 attached to the side walls. A pair of tethers 20 are each attached at a first end to a side wall 22 and extend to tailgate 10, each being attached to a nearby arm 46a, 46b of tailgate frame 26 as shown in FIG. 2.

In a first operational mode, tailgate 10 is held in a generally vertical closed position (FIG. 1) by tailgate latches 44 in cooperation with tailgate strikers 54 (FIG. 4). Likewise, door assembly 24 is held in a closed position proximate door frame 26 (FIG. 1) by door latch 40 in cooperation with door striker 52 (FIG. 4).

In a second operational mode, when tailgate 10 is to be lowered from the closed position to the open position tailgate release handle 18 (FIGS. 1, 4) is actuated, causing actuating cable(s) 48 to release tailgate latches 44 from strikers 54. Tailgate 10 may then be lowered to its open position, with tethers 20 limiting downward travel of the tailgate and supporting the tailgate in the open position as shown in FIG. 2. When tailgate 10 is to be closed the tailgate is pivoted upwardly to a generally vertical position, causing latches 44 to engage corresponding strikers 54. Latches 44 and strikers 54 cooperate to retain the tailgate in the closed position.

In a third operational mode, when door assembly 24 is to be pivoted from its closed position to an open position door release handle 30 is actuated (FIG. 1), causing door latch 40 to be released from striker 52 (FIG. 4). Door assembly 24 may then be swung away from tailgate frame 26 as shown in FIG. 3, the maximum travel of the door assembly being limited to a predetermined maximum open position with respect to the tailgate frame by travel limiter 42 (FIG. 4).

With door assembly 24 in an open position a user can easily reach bed 12 of the pickup truck to load or remove cargo stored therein. Similarly, a user may easily access a storage compartment such as storage compartment 60 (FIGS. 1 through 3), which is generally flush with the floor of the bed.

When door assembly 24 is to be closed the door assembly is pivoted toward tailgate frame 26, causing latch 40 to engage striker 52. Latch 40 and striker 52 cooperate to retain the door in the closed position.

The various components of tailgate 10 discussed above may be made from any types or combinations of material that are suitable for use with the tailgate and the expected environment including, without limitation, metal, plastic and composites. In addition, the various components of tailgate 10 may be formed in any conventional manner including, without limitation, casting, machining, forming, molding and stamping. Furthermore, the various components of tailgate 10 may be finished in any conventional manner such as painting, coating or plating, or may be left unfinished. Lastly, the various components of tailgate 10 may be joined together in any conventional manner including, without limitation, one or more fasteners, sheet metal screws, nuts and bolts, rivets, welding and adhesive.

In an optional embodiment of the present invention door assembly 24 may include an opening 56 formed in door frame 32 and covered with a covering material such as a mesh or netting 58 as shown in FIGS. 1 through 4, providing the driver with improved rear visibility. Mesh 58 may be permanently or detachably attached to door frame 32 and across opening 56 in any conventional manner including, without limitation, fasteners, hook-and-loop, brackets, snaps, hooks and adhesive. Mesh 58 may optionally further include visual indicia such as branding or other specialty messages.

Figure 5:
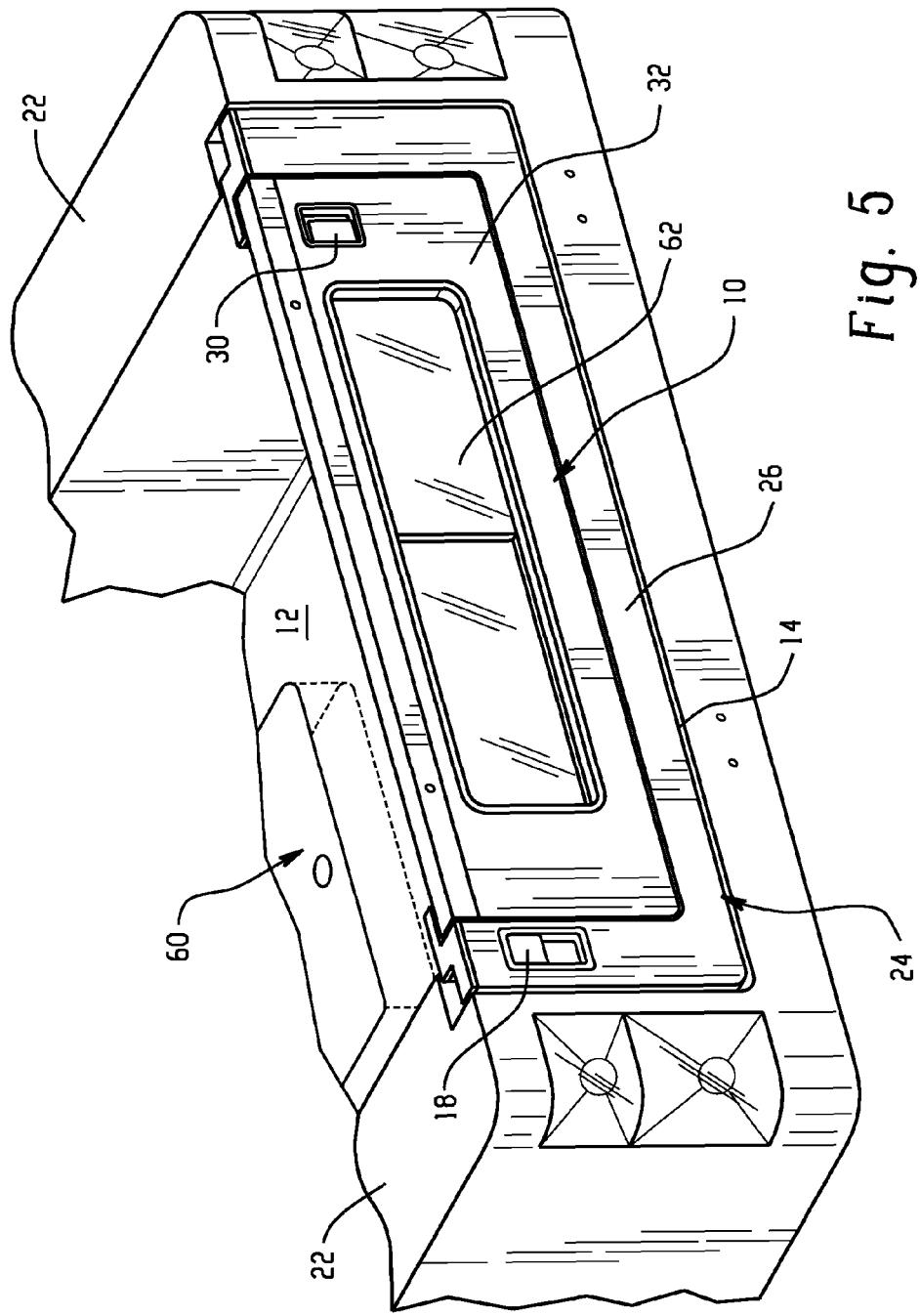
FIG. 5 is a perspective view of a tailgate for a pickup truck according to an alternate embodiment of the present invention.

Likewise, opening 56 may be covered with a covering material 62 which may be one or more of a metal panel and a generally transparent glass or plastic panel, as shown in FIG. 5. The metal, glass or plastic covering material 62 may be provided as a single panel or plural panes, and may be permanently attached to door frame 32, removable therefrom, or slidable into the door frame. In addition, the metal, glass or plastic covering material 62 may optionally further include visual indicia such as branding or other specialty messages.

In another embodiment of the present invention tailgate 10 is removable from bed 12. In this embodiment hinges 16 are configured to be selectively released in any conventional manner from at least one of tailgate 10 and bed 12. For example, hinges 16 may each include a removable pin 64 (FIG. 4), allowing the hinges to separate into halves. A first half of each hinge 16 will remain attached to bed 12, while the corresponding halves will remain attached to tailgate 10. Likewise, tethers 20 are configured to be selectively released in any conventional manner from at least one of tailgate 10 and bed 12, such as conventional rope snap hooks. Tailgate 10 may be easily re-attached to bed 10 by aligning the corresponding halves of hinges 16 and re-inserting pins 64 into each hinge, then re-attaching the tethers 20 to tailgate 10 and bed 12.

In the embodiment of FIGS. 3 and 4 the door assembly 24 is configured to pivot from the left-hand side of tailgate frame 26 as viewed from the rear of the pickup. However, one skilled in the art will appreciate that door assembly 24 may be configured to pivot from the right-hand side of tailgate frame 26 as viewed from the rear of the pickup by appropriate rearrangement of hinges 28, door release handle 30, door latch 40 and door striker 52 in mirror-image fashion.

Similarly, in the embodiment of FIGS. 3 and 4 the door assembly 24 is configured to pivot from a closed position proximate tailgate frame 26 to an open position wherein the door assembly swings outwardly and away from the bed 12. However, door assembly 24 may be configured to open inwardly, i.e., toward bed 12 by appropriate orientation of knuckles 68 of hinges 28 to allow for inward travel of the door assembly. The installation and operational characteristics of conventional hinges are well-known in the art and thus need not be further detailed herein.

Door assembly 24 may also be arranged to be removable from tailgate frame 26. In this embodiment hinges 28 are configured to be selectively released in any conventional manner from at least one of door assembly 24 and tailgate frame 26. For example, door hinges 28 may each include a removable pin 66 (FIG. 4), allowing the hinges to separate into halves in this arrangement. A first half of each hinge 28 remains attached to tailgate frame 26, while the corresponding halves remain attached to door assembly 24. Door assembly 24 may be easily re-attached to tailgate frame 26 by aligning the corresponding halves of hinges 28 and re-inserting pins 66 into each hinge.

In yet another optional embodiment of the present invention one or more components of door assembly 24 may be formed as a substantially unitary piece by any conventional process, such as molding and machining. For example, with reference to FIG. 4 door frame 32, pillars 34, 36 and cover 38 may be formed together as a unitary door frame.

While this invention has been shown and described with respect to a detailed embodiment thereof, it will be understood by those skilled in the art that changes in form and detail thereof may be made without departing from the scope of the claims of the invention.

What is claimed is:

1. A tailgate for the bed of a pickup truck, comprising:
   a generally U-shaped tailgate frame having a single opening, the tailgate frame being adapted to be coupled to the bed of the pickup truck and pivotable about a first permanent axis between a generally vertical closed position and a generally horizontal open position; and a single door assembly coupled to the tailgate frame and extending completely across the single opening of the tailgate frame, the door assembly being pivotable about a second permanent axis oriented generally normal relative to the first axis for movement between a closed position proximate the tailgate frame and an open position away from the tailgate frame, the door assembly pivoting outwardly and away from the bed of the pickup truck in the open position.

2. The tailgate of claim 1 wherein the tailgate frame is releasably latched to side walls of the pickup truck.

3. The tailgate of claim 1 wherein the door assembly is releasably latched to the tailgate frame.

4. The tailgate of claim 1 further comprising a pair of tethers, each tether extending between a side wall of the pickup truck and a nearby arm of the tailgate frame and having a predetermined length to limit downward travel of the tailgate in the open position.

5. The tailgate of claim 1, further comprising a travel limiter interposed between the tailgate frame and the door assembly to limit the travel of the door assembly to a predetermined maximum open position with respect to the tailgate frame.

6. The tailgate of claim 1 wherein the door assembly is configured to pivot about a left arm of the tailgate frame.

7. The tailgate of claim 1 wherein the door assembly is configured to pivot about a right arm of the tailgate frame.

8. The tailgate of claim 1 wherein the tailgate frame is detachably coupled to the bed of the pickup truck.

9. The tailgate of claim 1 wherein the door assembly further includes a unitary door frame.

10. The tailgate of claim 1, further comprising an opening formed in the door assembly.

11. The tailgate of claim 10, wherein the opening is covered with a covering material comprising at least one of a metal panel, plastic panel, glass panel and a mesh material.

12. The tailgate of claim 11 wherein the covering material is removable from the opening.

13. The tailgate of claim 11 wherein at least one of the metal panel, plastic panel and glass panel comprise a plurality of panes that are slidable into a door frame of the door assembly.

14. A tailgate for the bed of a pickup truck, comprising:
a generally U-shaped tailgate frame having a single opening, the tailgate frame being adapted to be coupled to a bed of the pickup truck and pivotable about a first permanent axis between a generally vertical closed position and a generally horizontal open position, the tailgate frame being releasably latched to side walls of the pickup truck; and a single door assembly coupled to the tailgate frame and extending completely across the single opening of the tailgate frame, the door assembly being pivotable about a second permanent axis oriented generally normal relative to the first axis for movement between a closed position proximate the tailgate frame and an open position away from the tailgate frame, the door assembly pivoting outwardly and away from the bed of the pickup truck in the open position, wherein the door assembly is releasably latched to the tailgate frame.

15. The tailgate of claim 14, further comprising an opening formed in the door assembly.

16. The tailgate of claim 15, wherein the opening is covered with a covering material comprising at least one of a metal panel, plastic panel, glass panel and a mesh material.

17. A tailgate for a pickup truck, comprising:
a generally U-shaped tailgate frame having a single opening, the tailgate frame being adapted to be coupled to a bed of the pickup truck and pivotable about a first permanent axis between a generally vertical closed position and a generally horizontal open position, the tailgate frame being releasably latched to side walls of the pickup truck;

a single door assembly coupled to the tailgate frame and extending completely across the single opening of the tailgate frame, the door assembly being pivotable about a second permanent axis oriented generally normal relative to the first axis for movement between a closed position proximate the tailgate frame and an open position away from the tailgate frame, the door assembly pivoting outwardly and away from the bed of the pickup truck in the open position wherein the door assembly is releasably latched to the tailgate frame;

an opening formed in the door assembly, the opening being covered with a covering material comprising at least one of a metal panel, plastic panel, glass panel and a mesh material;

a pair of tethers, each tether extending between a side wall of the pickup truck and a nearby arm of the tailgate frame and having a predetermined length to limit downward travel of the tailgate in the open position; and a travel limiter interposed between the tailgate frame and the door assembly to limit the travel of the door assembly to a predetermined maximum open position with respect to the tailgate frame.

\* \* \* \* \*